K. JUNG.
SHAPING MACHINE.
APPLICATION FILED DEC. 8, 1913.
1,114,363.
Patented Oct. 20, 1914.
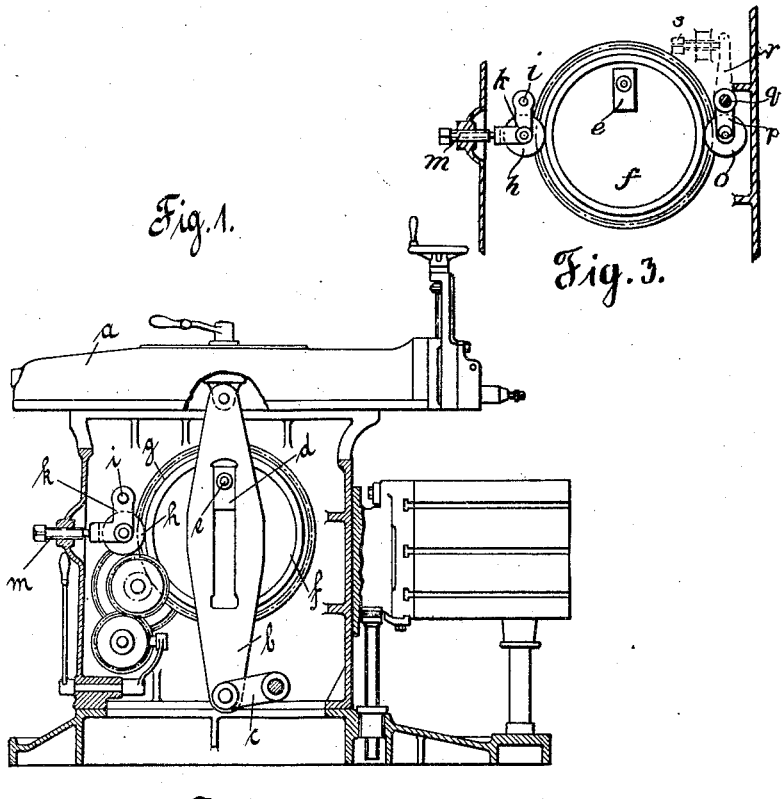

UNITED STATES PATENT OFFICE.

KARL JUNG, OF BERLIN, GERMANY, ASSIGNOR TO GENERAL COMPOSING COMPANY, GESELLSCHAFT MIT BESCHRANKTER HAFTUNG, OF BERLIN, GERMANY, A CORPORATION OF PRUSSIA.

SHAPING-MACHINE.

1,114,363.  Specification of Letters Patent.  Patented Oct. 20, 1914.

Application filed December 8, 1913. Serial No. 805,474.

*To all whom it may concern:*

Be it known that I, KARL JUNG, manager, a subject of the German Emperor, and residing at 58/59 Gross-Beeren strasse, Berlin, in the Kingdom of Prussia, German Empire, have invented certain new and useful Improvements in Shaping-Machines, of which the following is a specification.

This invention relates to a slide-moving device for machine tools, more particularly for tool slides of shaping machines. In these machines, it is usual to move the tool slide by means of a rocking lever which is driven by means of a link. The pin of the slide block is mounted on the driving gear wheel. The result of this construction is that, more particularly when thick shavings are removed during the working stroke, there takes place a canting of the rocking lever and a severe stress both on the pin of the slide block and on the bearing journal for the toothed wheel. The depth of cut is therefore limited by the construction of the slide or carriage movement, even when the tool is suitable for removing thick shavings.

This invention obviates the said disadvantage by supporting the gear wheel in direct proximity to the pin for the slide block, by setting off for instance the toothed wheel on the outside and supporting it again. As the stress is chiefly produced during the working stroke it is in most cases sufficient to arrange an abutment only on one side of the toothed wheel. In that way, it is possible to adjust to a very deep cut and the output of the machine is considerably increased.

The drawings illustrate three constructional forms of this invention in its application to a shaping machine, Figure 1 being a side elevation of the shaping-machine, partly in section, and Fig. 2 a partial cross-section through Fig. 1. Fig. 3 shows a modified constructional form of the support according to the invention. Fig. 4 is a side view of the right hand part of Fig. 3. Fig. 5 is a further modification.

As shown in the drawing the shaping machine itself is of the well known construction. The slide *a* for the tool is driven by rocking lever *b* which is pivoted on one side to the tool slide and on the other side by means of a rod *c* to the machine frame. The rocking lever is provided with a slot in which the slide block *d* moves. The pin *e* mounted in the slide block is arranged on the gear wheel *f* driven in the known manner.

In order to avoid, during heavy cuts, an excessive stress on the pin *e*, a canting of the link and of the rocking lever, as well as an excessive stress on the bearing journal *n* of the toothed wheel *f*, the gear wheel is according to this invention supported in direct proximity to the rotating plane of the pin *e*. In the drawing, this support is effected by providing the gear wheel *f* on its outer side with an offset, so that the toothed rim has on its outside a smooth ring *g*. With the said ring *g* engages a roller *h* mounted in a rocking lever *k* rotatable about a point *i* on the machine frame, and can be adjusted by means of a set screw *m* and held in contact with the ring *g*. The roller *h* is arranged in such a manner that during the working stroke, it takes up the pressure exercised by the pin *e* on the gear wheel *f* and thus does away with the above-mentioned disadvantages.

As a rule, it is sufficient, for taking up the pressure, to use the construction shown in the Figs. 1 and 2 of the drawings. In certain cases it may be necessary for the purpose of taking up the stresses during the return stroke, to arrange an abutment also on the other side as shown in Figs. 3 and 4. This further abutment may be formed as a roller *o* mounted in a rocking lever *p* fastened on a bolt *q*. This bolt bears an arm *r* lying against a set screw *s* by which the roller can be adjusted and held in contact with the ring *g*. Also the toothed wheel may be supported completely around the ring *g*, so that the wheel is supported during the whole forward and return strokes. Such support *t* is shown in Fig. 5 of the drawings.

Having now particularly described and ascertained the nature of my said invention and in what manner the same is to be performed, I declare that what I claim is:—

1. In a slide-moving device for machine tools more particularly for shaping machines in combination a driving spindle, a rotating machine element mounted on the end of the driving spindle, a pin carried by said machine element and transmitting the movement to the slide and an additional support for the said machine element provided in the plane of rotation of the pin and on that face of the said element which tends to resist the cutting stress.

2. In a slide-moving device for machine tools more particularly for shaping machines in combination a driving spindle, a rotating gear wheel mounted on the end of the driving spindle, a pin carried by said gear wheel and transmitting the movement to the slide and an additional support for the said gear wheel provided in the plane of rotation of the said pin and on that face of the said gear wheel, which tends to resist the cutting stress.

3. In a slide-moving device for machine tools more particularly for shaping machines in combination a driving spindle, a rotating machine element mounted on the end of the driving spindle, a pin carried by said machine element and transmitting the movement to the slide and an additional support for the said machine element provided in the plane of rotation of the pin and on that face of the said element which tends to resist the cutting stress and operative only at intervals.

4. In a slide-moving device for machine tools more particularly for shaping machines in combination a driving spindle, a rotating machine element mounted on the end of the driving spindle, a pin carried by said machine element and transmitting the movement to the slide and an additional support for the said machine element provided in the plane of rotation of the pin and on that face of the said element which tends to resist the cutting stress and operative only during the working stroke.

5. In a slide-moving device for the machine tools more particularly for shaping machines in combination a driving spindle, a rotating gear wheel mounted on the end of the driving spindle, a pin carried by said gear wheel and transmitting the movement to the slide and an additional support for the said gear wheel arranged in direct proximity to the pin, said gear wheel being provided with an annular projection engaging with the said additional support.

6. In a slide-moving device for machine tools more particularly for shaping machines in combination a driving spindle, a rotating gear wheel mounted on the end of the driving spindle, a pin carried by said gear wheel and transmitting the movement to the slide and an additional support for the said gear wheel arranged in direct proximity to the pin, said gear wheel being provided with an annular projection and said additional support consisting of rollers engaging with said annular projection.

7. In a slide-moving device for machine tools more particularly for shaping machines in combination a driving spindle, a rotating gear wheel mounted on the end of the driving spindle, a pin carried by said gear wheel and transmitting the movement to the slide and an additional support for the said gear wheel arranged in direct proximity to the pin, said gear wheel being provided with an annular projection and said additional support consisting of rollers engaging with said annular projection in such a manner that they take up the pressure of the pin during the period of the highest pressure.

8. In a slide-moving device for machine tools more particularly for shaping machines in combination a driving spindle, a rotating gear wheel mounted on the end of the driving spindle, a pin carried by said gear wheel and transmitting the movement to the slide and an additional support for the said gear wheel arranged in direct proximity to the pin, said gear wheel being provided with an annular projection and said additional support consisting of rollers engaging with said annular projection and being adjustably arranged.

In testimony whereof I have affixed my signature in presence of two witnesses.

KARL JUNG.

Witnesses:
HENRY HASPER,
WOLDEMAR HAUPT.

---

Copies of this patent may be obtained for five cents each, by addressing the "Commissioner of Patents, Washington, D. C."